United States Patent
Durecu et al.

(10) Patent No.: US 8,190,133 B2
(45) Date of Patent: May 29, 2012

(54) METHOD FOR ADAPTING A COMMUNICATION INVOLVING A USER EXHIBITING A PHYSICAL LIMITATION, AND ASSOCIATED CORE NETWORK AND SERVICES

(75) Inventors: Olivier Durecu, Nozay (FR); Bruno Legat, Nozay (FR)

(73) Assignee: Alcatel Lucent, Paris (FR)

( * ) Notice: Subject to any disclaimer, the term of this patent is extended or adjusted under 35 U.S.C. 154(b) by 0 days.

(21) Appl. No.: 12/740,159

(22) PCT Filed: Oct. 13, 2008

(86) PCT No.: PCT/FR2008/051854
§ 371 (c)(1),
(2), (4) Date: Aug. 30, 2010

(87) PCT Pub. No.: WO2009/056717
PCT Pub. Date: May 7, 2009

(65) Prior Publication Data
US 2011/0009099 A1    Jan. 13, 2011

(30) Foreign Application Priority Data

Oct. 29, 2007 (FR) .................................... 07 58654

(51) Int. Cl.
*H04M 3/42* (2006.01)
(52) U.S. Cl. ................................ 455/414.1; 455/414.4
(58) Field of Classification Search ............... 455/414.1, 455/414.4
See application file for complete search history.

(56) References Cited

U.S. PATENT DOCUMENTS
2005/0094777 A1    5/2005    McClelland
2008/0311888 A1*    12/2008    Ku et al. .................... 455/414.1

OTHER PUBLICATIONS

Magedanz T. et al., "The IMS Playground 169 Fokus—an Open Testbed for Next Generation Network Multimedia Services," Proceedings of the First International Conference on Testbeds and Research Infrastructures for the Development of Networks and Communities (TRIDENTCOM'05), IEEE XP010774253, 10 pages, (Feb. 23, 2005).
International Search Report.

* cited by examiner

*Primary Examiner* — Barry W Taylor
(74) *Attorney, Agent, or Firm* — Fay Sharpe LLP

(57) ABSTRACT

A method is devoted to adapting communication within a communication network with a service core network (CR). This method consists of adding to user profiles (who are subscribers to the network's services) an information field describing at least one physical limitation, and if a signaling message is received regarding communication involving a user whose user profile describes a given physical limitation, of adding to that signaling message a header representative of that physical limitation. Thus, whenever a communication device (T1) involved in the communication with said user receives the signaling message, it adapts, if he or she is affected and so desires, the type and/or at least one parameter of the communication with the user based on the physical limitation.

8 Claims, 1 Drawing Sheet

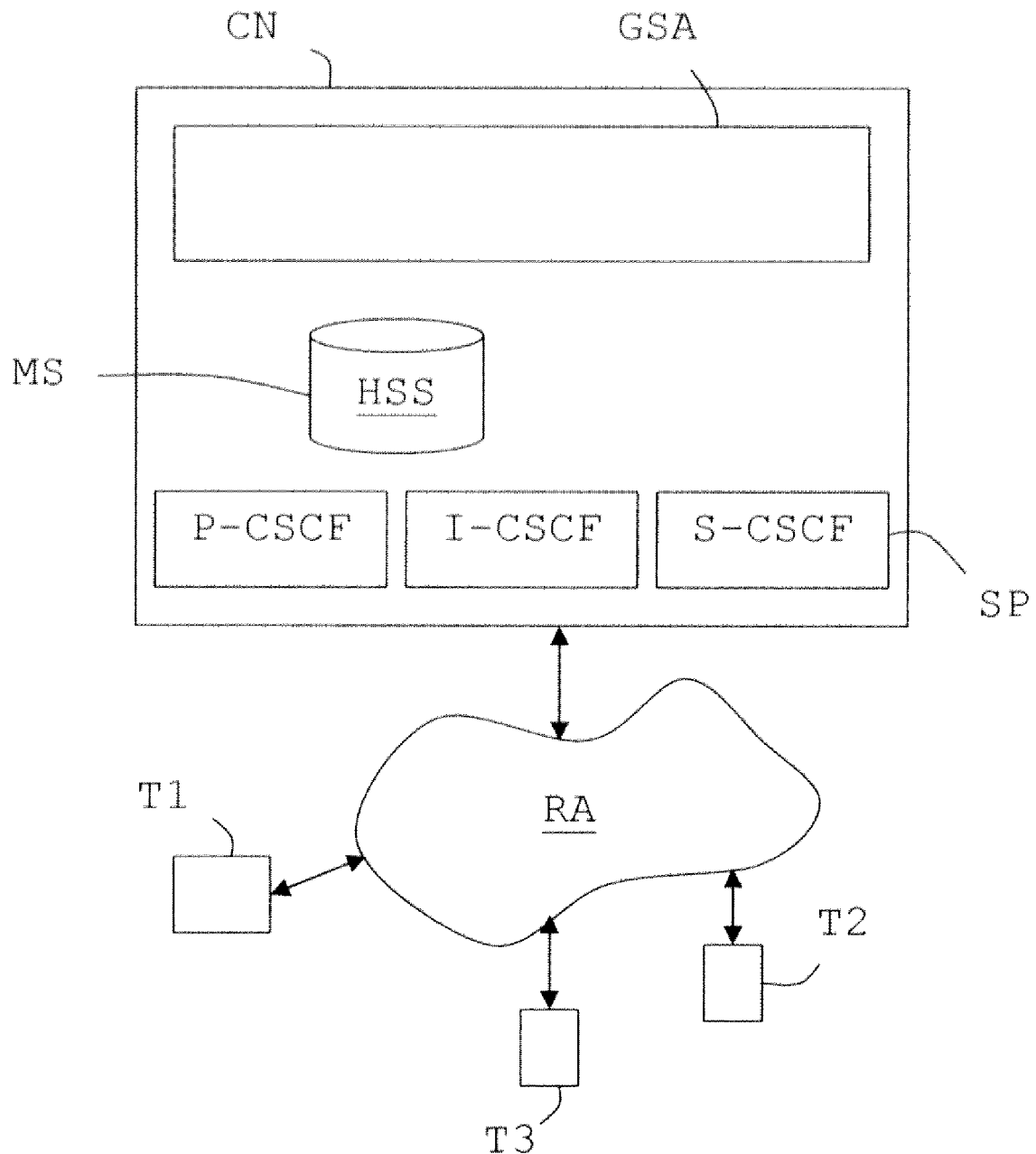

METHOD FOR ADAPTING A COMMUNICATION INVOLVING A USER EXHIBITING A PHYSICAL LIMITATION, AND ASSOCIATED CORE NETWORK AND SERVICES

The invention pertains to communication networks comprising a so-called services core network, such as IMS (for "IP Multimedia Subsystem").

As is known to the person skilled in the art, service core networks, such as IMS networks, have been developed by communication network operators (potentially offering IP connectivity) in order to offer specific services to subscribing users (or subscribers). For example, an IMS service core network (or domain) may enable a user to display on the screen of his or her communication terminal (whether mobile or fixed or wireless) a personal webpage of a calling user, or to have improved voice communication services, or IP multimedia services, or instant messaging services, or to cause several of his or her terminals to ring whenever he or she is called. The implementation of these services (IMS) is generally done using the SIP signaling protocol (for "Session Initiation Protocol").

As a reminder, connecting a user communication terminal to a service core network (or domain), potentially an IMS network, is done by means of a mobile network's access network which is called packed-switched or "PS", such as a GPRS, 3G (UMTS), (W)CDMA, HSDPA, or FOMA network, or a land-line network's access network, such as an ADSL network, or a wireless local area network or WLAN's access network, such as a network compliant with the IEEE standard 802.11a, ETSI HiperLAN/2, Wi-Fi (IEEE 802.11g) or WiMAX (a grouping of the 802.16 and HiperMan standards, in particular).

Some users of a communication network having a service (or domain) core network, potentially an IMS network, have one or more physical limitations (or handicaps or physical incapacities) which significantly reduce their options for communicating with others. Thus, a person suffering from blindness cannot read the messages which are transmitted to him or her by others, a person suffering from deafness can neither participate in a telephone conversation nor be alerted by a ring tone, a person suffering from an inability to pick up a phone handset cannot answer a phone call from another person, and a person suffering from an inability to enter alphanumeric characters using an interface (a keyboard or mouse) can neither access text-based messages, which may be instant messages, nor respond to such text-based messages.

Certain operating settings of certain terminals may be adapted in order to take into account the physical limitation. Thus, it is possible to configure the mobile (or cellular) terminal of a user so that it vibrates instead of ringing whenever another person tries to contact him or her, or so that it will display text-based messages with a particular character font (for example, a much larger one). However, these configurations (or adaptations) remain highly limited, but above all local, and therefore explicitly restricted solely to the terminal of the user with a physical limitation.

The purpose of the invention is therefore to improve the situation.

To that end, it proposes a method devoted to adapting communications within a communication network with a service core network, and consisting of:

adding to user profiles (subscribers to the network's services) an information field which describes at least one physical limitation, and if a signaling message is received regarding a communication involving a user whose user profile describes a given physical limitation, adding to that signaling message a header representative of that physical limitation, so that whenever a communication device involved in communication with the user receives that signaling message, it adapts, if he or she is affected and so desires, the type and/or at least one parameter of the communication with the user based on the physical limitation.

The method of the invention may comprise other characteristics, which may be taken separately or in combination, in particular:

each adaptation may, for example, be chosen from among (at least) increasing the font size of the text to be displayed on the screen, converting audio data into text data, converting text data into audio data, switching from ringing call mode to vibrating call mode, and using text-based messages, potentially instant messages, instead of telephone communications;

every physical limitation may, for example, be chosen from among (at least) a vision impairment, blindness, a hearing impairment, deafness, paralysis, and an inability to pick up a call and/or enter alphanumeric characters;

whenever the core network is IMS, headers representative of one or more physical limitations may be added to the signaling messages in an S-CSCF module that it comprises.

The invention also proposes a service core network for a communication network, comprising:

user information storage means specifically for storing user profiles (subscribers to the network's services) comprising an information field describing at least one physical limitation, and an intermediary signaling message-processing device tasked, whenever it receives a signaling message about a communication involving a user whose user profile describes a given physical limitation, with adding a header representative of that physical limitation to that signaling message.

The inventive core network may comprise other characteristics, which may be taken separately or in combination, and particularly:

every physical limitation may, for example, be chosen from among (at least) a vision impairment, blindness, a hearing impairment, deafness, paralysis, and an inability to pick up a call and/or enter alphanumeric characters;

every header added to a signaling message may be intended to enable a communication device which has received that message and which is involved in communication with a user whose user profile describes a given physical limitation, to adapt, if he or she is affected and so desires, the type and/or at least one parameter of the communication with that user based on that physical limitation;

each adaptation may, for example, be chosen from among (at least) increasing the font size of the text to be displayed on the screen, converting audio data into text-based data, converting text-based data into audio data, switching from ringing call mode to vibrating call mode, and using text-based messages, potentially instant messages, instead of telephone communications;

whenever it is IMS, the intermediary signaling message-processing device may be an S-CSCF module.

The invention is particularly well-suited, although not exclusively so, to IMS service core networks (or IMS domains).

Other characteristics and advantages of the invention will become apparent upon examining the detailed description below, and the attached drawing, in which the sole FIGURE very schematically and functionally depicts an IMS core network coupled to an access network and equipped with an HSS module and an addition server according to the invention, which is S-CSCF. The drawing may serve not only to complete the invention, but also to contribute to defining it, if need be.

The purpose of the invention is to enable the adaptation of communication involving communication terminals belonging to users of the service core network (or domain) who exhibit one or more physical limitations.

In what follows, it is assumed by way of an illustrative, non-limiting example that the users are subscribers to services of a communication network coupled to an IMS service (or domain) core network. However, the invention is not limited to this type of service core network.

Furthermore, in what follows, the service core network (or IMS domain) CR will only be considered independently of the access network(s) RA via which it may be connected to communication terminals Ti (here i=1 to 3). Any type of access network RA may ensure the connection between an IMS core network (or domain) CR according to the invention and a (fixed or mobile (or portable)) communication terminal Ti, and particularly a radio access network of a mobile (or cellular) which is a packet-switched or PS network, such as a GPRS, 3G (UMTS), (W)CDMA, HSDPA, or FOMA network, or an access network of a land-line communication network, such as an xDSL network, or a radio access network of a wireless local area (WLAN ("Wireless Local Area Network"—IEEE 802.11, Wi-Fi, and ETSI HiperLAN/2 standards) or Bluetooth (IEEE 802.15), WiMAX (IEEE 802.16, ETSI HiperMAN) and Zigbee) network.

The term "communication terminal" Ti here refers to a communication device that may connect to at least one access network RA of a communication network coupled to a service core network (here IMS) CR, so as to exchange data or signals (potentially radio signals) with another communication device. It may therefore be, for example, a landline or mobile (or cellular) telephone, a communicating personal digital assistant (or PDA), or a desktop or portable computer equipped with a communication device.

The sole FIGURE schematically depicts an IMS service core network (or domain) CR to which an access network RA of a communication network is connected (directly or via a gateway).

As the components of an IMS core network CR are well known to the person skilled in the art, they will not be described in detail here, as is particularly done in the specification RFC 23.002 from the organization 3GPP, available on the 3GPP's website. Instead, as a simple reminder, a few features of IMS core network CR modules are reiterated below, which may be helpful to understanding the invention.

An IMS core network CR enables subscribing users to access specific IMS services whenever they are connected to the network they belong to, or potentially to a visited network if they are "roaming".

An IMS core network particularly comprises a P-CSCF (for "Proxy-Call Session Control Function") module, an S-CSCF (for "Serving-Call Session Control Function") module, an I-CSCF (for "Interrogating-Call Session Control Function") module, and a group of application servers GSA.

The P-CSCF module is an IMS session control module. It is the first point of contact with the IMS core network CR for a subscribing user's terminal Ti. This P-CSCF module comprises a CSCF function ensuring that the messages are routed using the SIP protocol ("Session Initiation Protocol"). Generally, and notably, it ensures a security function, a user plane control function, an SIP compression function, a billing identifier generating function, so a subscriber identity statement function, a function for matching the subscriber's public address and IP address, and a function for managing routing to and from another session control module called S-CSCF.

The S-CSCF module constitutes the entrance to the IMS services offered by the IMS core network CR. To that end, it is connected to one or more application servers of the group GSA. It is particularly tasked with authenticating subscribers and storing the address of the P-CSCF module to which the terminal Ti of a subscribing user of the IMS core network CR is connected.

The session control module or I-CSCF module is tasked with initiating the registering of a communication terminal Ti with the S-CSCF module that belongs to the IMS core network (called the "receiver") with which he or she has subscribed to the IMS services. It is also tasked with looking for where subscribers to the IMS services in its IMS core network CR are located. To that end, it is generally connected to the IMS core networks (or domains) of other operators besides its own, and more specifically to their S-CSCF modules.

The application servers of the group GSA are tasked with offering specific IMS services. For example, one of them is a voice server, another one is an e-mail server, another one is an instant messaging (IM) server, another one is an Internet server (or web server) tasked with providing access to web pages of one or more web sites, and another one is a relational data server, potentially an XDMS ("XML Data Management Server") tasked with so providing information regarding users of the IMS core network CR (lists (or groups) of contacts, user profiles, access and presence authorizations, etc.). Some of these application servers, such as the voice server, e-mail server, instant messaging server, and web server, are configured to participate in communications with communication terminals Ti.

The invention proposes to implement a new method intended to adapt communications which involve at least one user subscribed to the IMS core network CR and who exhibits at least one physical imitation.

Here, the term "phyiscal limitation" refers to any type of impairment or physical incapacity which a user has, and which may limit his or her options for communicating with others. Consequently, it may, for example, in a non-exhaustive and non-limiting fashion, be a vision impairment, blindness, a hearing impairment, deafness, paralysis of a limb (in particular an upper one), or an inability to pick up a handset and/or enter alphanumeric characters with a human/machine interface (keyboard or mouse).

The inventive method first consists of adding to user profiles (subscribers to the IMS core network CR) an information field, called an ability field, which indicates at least one physical limitation.

Within an IMS core network, the data which defines the user profiles is generally stored in a user information storage module (or subscription database), called the HSS (for "Home Subscriber Server"). Consequently, it is advantageous here to store the ability information field within the HSS module MS.

It is important to note that this ability information field is entered at the user's request, whenever he or she registers it with the IMS core network CR.

The inventive method then consists, whenever the IMS core network CR receives a signaling message about a communication which involves a user whose user profile describes (at least) one given physical limitation (within the ability information field) of adding to that signaling message a header which represents that physical limitation.

This header addition may be done by means of an intermediate network device (a "proxy" device) SP of the IMS core network CR. In an IMS core network, the signaling messages are SIP. Consequently, the intermediate network device SP is, for example, what a person skilled in the art calls an SIP proxy. For example, it may be the S-CSCF module.

Thus, whenever a communication device is involved in communication with a user exhibiting (at least) one recorded physical limitation, and he or she receives a signaling message to which has been added a header representative of that physical limitation, it may adapt the type and/or at least one communication parameter with the user based on the physical limitation, if it constitutes the device tasked with carrying out this adaptation and if he or she desires to carry out this adaptation.

It is important to note that any type of communications device that may need to adapt communications based on at least one physical limitation represented in an added header is concerned here. Consequently, it may also be a network element or device, such as an application server, in addition to being a user's communication terminal Ti. It should be understood that the communication device(s) which is/are involved in adapting communications vary(-ies) depending on the type(s) of adaptation(s) to perform. It should be noted that for a single communication, multiple (at least two) adaptations may be carried out, which may potentially require the intervention of multiple different communication devices (or elements).

It should be noted that an adaptation generally concerns a subscribing user who is being called. However, it may also concern a subscribing user who initiates a communication.

The adaptations which may be carried out may particularly include (in a non-limiting and non-exhaustive fashion) increasing the character font size of the text to be displayed on the screen, converting audio data into text data ("speech-to-text"), converting text data into audio data ("text-to-speech"), switching from ringing call mode to vibrating call mode, and using text-based messages, potentially instant messages, instead of telephone communications.

Thus, whenever the user is deaf and is involved in an audio (telephone) communication, the adaptation may consist of converting the audio data which is intended for him or her into text data which is displayed on the screen of his or her communication terminal, or to propose chat-style instant-messaging communication. In these situations, the adaptation may, for example, be done within a communication device such as an x-CSF module, an application server, or a communication terminal Ti. Additionally, ringing call mode may be switched to vibrating call mode within one's own communication terminal Ti.

Whenever the user has a hearing impairment and is involved in an audio (telephone) communication, the adaptation may consist of substantially increasing the output sound volume of his or her communication terminal's Ti speaker, or to propose chat-style instant-messaging communication. In this situation, the adaptation may, for example, be done within a communication device such as an x-CSF module, an application server, or a communication terminal Ti. Additionally, ringing call mode may be switched to vibrating call mode within one's own communication terminal Ti.

Whenever the user is blind and is involved in a text-based communication (messaging, potentially instant messaging), the adaptation may consist of converting the text data which are intended for him or her into audio data which is distributed using the speaker of his or her communication terminal, or to propose audio (telephone) communication. In these situations, the adaptation may, for example, be done within a communication device such as an x-CSF module, an application server, or a communication terminal Ti.

Whenever the user has a vision impairment and is involved in a text-based communication (messaging, potentially instant messaging), the adaptation may consist of increasing the character font size of the text to be displayed on the screen of his or her communication terminal Ti, or to propose audio (telephone) communication. In this situation, the adaptation may, for example, be done within a communication device such as an x-CSF module, an application server, or a communication terminal Ti.

Whenever the user is paralyzed or exhibits an inability to pick up a handset and/or enter alphanumeric characters with a human/machine interface (keyboard or mouse), and is involved in a text-based communication (messaging, potentially instant messaging), the adaptation may consist of converting the text data which is intended for him or her into audio data which is distributed by means of the speaker of his or her communication terminal, or to propose audio (telephone) communication. In these situations, the adaptation may, for example, be done within a communication device such as an x-CSF module, an application server, or a communication terminal Ti.

In order to enable a communication adaptation, the communication device has adaptation information which is specific to itself and which it stores within storage means, such as a memory. This adaptation information may, for example, be contained within a table which gives matches between different physical limitations and the communication adaptations to be made.

It is important to note that adaptation may also potentially make it possible to convert audio data (or text data, respectively), taken from the terminal Ti of a user exhibiting a physical limitation and intended for another person, into text data (or audio data, respectively) whenever the communication established between that person and that user is a messaging (or telephone, respectively) communication.

The intermediate device SP may be constructed in the form of electronic circuitry, software (or computing) modules, or a combination of circuitry and software.

The invention is not limited to the embodiments of a service core network or to the method of adapting communication as described above, but rather encompasses all variants that a person skilled in the art may consider within the framework of the claims below.

The invention claimed is:

1. A method for adapting communication within a communication network with a service core network (CR), comprising adding to user profiles, said users being subscribers to services of said network, an information field describing at least one physical limitation, and if a signaling message is received regarding communication involving a user whose user profile describes a given physical limitation, of adding to said signaling message a header representative of that physical limitation, so that whenever a communication device involved in said communication with said user receives said signaling message, it adapts, if he or she is affected and so desires, the type and/or at least one parameter of the communication with said user based on said physical limitation.

2. A method according to claim 1, wherein each adaptation is chosen from a group comprising at least one increase in the character font size of a text to be displayed on the screen, a conversion of audio data into text data, a conversion of text data into audio data, a change from ringing call mode to vibrating call mode, and a use of text messages, potentially instant messages, instead of telephone communication.

3. A method according to claim 1, wherein each physical limitation is chosen from a group comprising at least a vision impairment, blindness, a hearing impairment, deafness, and an inability to pick up a call and/or enter alphanumeric characters.

4. A method according to claim 1, wherein adding headers representative of physical limitations to the signaling messages may be done within an S-CSCF module (SP).

5. A service core network (CR) for a communication network, comprising i) user information storage means (MS) capable of storing user profiles, said users being subscribers to services of said network, comprising an information field describing at least one physical limitation, and ii) an intermediary signaling message-processing device (SP) configured, whenever it receives a signaling message regarding a communication involving a user whose profile describes a given physical limitation, to add to that signaling message a header representative of that physical limitation wherein every header added to a signaling message is capable of enabling a communication device that receives said message and which is involved in communication with a user whose user profile describes a given physical limitation, to adapt, if he or she is affected and so desires, the type and/or at least one communication parameter with said user depending on said physical limitation.

6. A core network according to claim 5, wherein each physical limitation is chosen from a group comprising at least one vision impairment, blindness, a hearing impairment, deafness, a paralysis, and an inability to pick up a call and/or enter alphanumeric characters.

7. A core network according to claim 5, wherein each adaptation is chosen from a group comprising at least one increase in the character font size of a text to be displayed on the screen, a conversion of audio data into text data, a conversion of text data into audio data, a change from ringing call mode to vibrating call mode, and a use of text messages, potentially instant messages, instead of telephone communication.

8. A core network according to claim 5 wherein the intermediary signaling message-processing device is an S-CSCF module.

* * * * *